United States Patent
Ko et al.

(10) Patent No.: US 11,032,019 B2
(45) Date of Patent: Jun. 8, 2021

(54) METHOD FOR TRANSMITTING SYNCHRONIZATION SIGNAL IN WIRELESS COMMUNICATION SYSTEM AND APPARATUS THEREFOR

(71) Applicant: LG ELECTRONICS INC., Seoul (KR)

(72) Inventors: Hyunsoo Ko, Seoul (KR); Kijun Kim, Seoul (KR); Byounghoon Kim, Seoul (KR); Youngsub Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,102

(22) PCT Filed: Mar. 2, 2018

(86) PCT No.: PCT/KR2018/002512
§ 371 (c)(1),
(2) Date: Jun. 21, 2018

(87) PCT Pub. No.: WO2018/164414
PCT Pub. Date: Sep. 13, 2018

(65) Prior Publication Data
US 2021/0091872 A1    Mar. 25, 2021

Related U.S. Application Data
(60) Provisional application No. 62/512,727, filed on May 31, 2017, provisional application No. 62/470,891, (Continued)

(51) Int. Cl.
*H04W 56/00* (2009.01)
*H04J 11/00* (2006.01)

(52) U.S. Cl.
CPC ....... *H04J 11/0073* (2013.01); *H04J 11/0076* (2013.01); *H04J 2211/005* (2013.01)

(58) Field of Classification Search
None
See application file for complete search history.

(56) References Cited

U.S. PATENT DOCUMENTS

2012/0046056 A1*  2/2012  Luo ................... H04J 11/0093
                                                                            455/502
2012/0314870 A1   12/2012 Kim et al.
(Continued)

FOREIGN PATENT DOCUMENTS

CN  102209377  10/2011
CN  103037411  4/2013
(Continued)

OTHER PUBLICATIONS

Russian Federation Federal Service for Intellectual Property, Patents and Trademarks Application Serial No. 2019104620, Notice of Allowance dated Feb. 11, 2020, 20 pages.
(Continued)

*Primary Examiner* — Brandon M Renner
(74) *Attorney, Agent, or Firm* — Lee Hong Degerman Kang Waimey

(57) ABSTRACT

The present invention discloses a method of transmitting an SSS (secondary synchronization signal), which is transmitted by a base station, in a wireless communication system. The method includes the steps of determining a first shift based on a first and a second cell identifiers for identifying a cell, and determining a second shift index based on the first cell identifier and transmitting the SSS using a first sequence which is generated based on the first shift index and a second sequence which is generated based on the second shift index. In this case, the first shift index can be determined as K times
(Continued)

a value determined based on the first and second cell identifiers, where K is an integer equal to or greater than 3.

20 Claims, 12 Drawing Sheets

Related U.S. Application Data filed on Mar. 14, 2017, provisional application No. 62/467,100, filed on Mar. 4, 2017.

(56) References Cited

U.S. PATENT DOCUMENTS

| | | | |
|---|---|---|---|
| 2014/0161043 | A1 | 6/2014 | Luo et al. |
| 2015/0092768 | A1 | 4/2015 | Ng et al. |
| 2015/0103870 | A1 | 4/2015 | Kim et al. |
| 2015/0280849 | A1 | 10/2015 | Tsai et al. |
| 2016/0149660 | A1 | 5/2016 | Seo et al. |
| 2016/0249348 | A1 | 8/2016 | Kang et al. |
| 2017/0033912 | A1* | 2/2017 | Onggosanusi ........ H04L 5/0057 |
| 2017/0311276 | A1* | 10/2017 | Tsai ................. H04L 27/2602 |
| 2018/0123750 | A1* | 5/2018 | Onggosanusi ...... H04L 27/2655 |
| 2018/0294910 | A1* | 10/2018 | Kim .................. H04L 27/2613 |
| 2019/0268866 | A1* | 8/2019 | Qu ......................... H04L 5/005 |
| 2020/0169363 | A1* | 5/2020 | Talarico ............... H04L 5/0048 |

FOREIGN PATENT DOCUMENTS

| | | |
|---|---|---|
| CN | 104753832 | 7/2015 |
| JP | 2020519141 | 6/2020 |
| KR | 101140109 | 5/2012 |
| KR | 101527613 | 6/2015 |
| KR | 1020160102501 | 8/2016 |
| KR | 1020170007163 | 1/2017 |
| RU | 2599542 | 10/2016 |
| WO | 2018202319 | 11/2018 |

OTHER PUBLICATIONS

Intel Corporation, "Synchronization Signal Sequence Design," 3GPP TSG-RAN WG1 #88, R1-1702180, Feb. 2017, 9 pages.
State Intellectual Property Office of the People's Republic of China Application Serial No. 201880014490.7, Office Action dated Jun. 2, 2020, 11 pages.
Intellectual Property Office of Singapore Application Serial No. 11201900436U, Notice of Allowance dated Apr. 27, 2020, 8 pages.
MediaTek Inc., "NR SSS Design and Evaluation," 3GPP TSG-RAN WG1 #89, R1-1709151, May 2017, 8 pages.
Huawei, HiSilicon, "Remaining Details for Synchronization," 3GPP TSG-RAN WG1 #89, R1-1708160, May 2017, 16 pages.
Japan Patent Office Application Serial No. 2019-556781, Notice of Allowance dated Aug. 4, 2020.
NTT Docomo, "Discussion and evaluation on NR synchronization signal sequence design", 3GPP TSG RAN WG1 Meeting #88, R1-1702826, Feb. 2017, 8 pages.
Nokia, et al., "Remainig details on SS sequence design", 3GPP TSG RAN WG1 Meeting #89, R1-1708231, May 2017, 7 pages.
Qualcomm, "Synchronization signal sequence design consideration", 3GPP TSG RAN WG1 NR AdHoc Meeting, R1-1700787, Jan. 2017, 9 pages.
PCT International Application No. PCT/KR2018/002512, Notification of Transmittal of the International Search Report and the Written Opinion of the International Searching Authority, or Declaration dated Jun. 14, 2018, 10 pages.
Qualcomm, "Potential Issues of NB-SSS in Asynchronous Deployment", 3GPP TSG RAN WG1 Meeting #85, R1-164403, May 2016, 12 pages.
3rd Generation Partnership Project (3GPP), "Technical Specification Group Radio Access Network; Study on New Radio (NR) Access Technology; Physical Layer Aspects (Release 14)," 3GPP TR 38.802 V1.2.0, Feb. 2017, 82 pages.
Intel, "On NSSS design and SFN index detection ambiguity", 3GPP TSG RAN WG1 Meeting #85, R1-165683, May 2016, 6 pages.
Indian Patent Office Application Serial No. 201927001953, Office Action dated Aug. 26, 2020, 14 pages.
European Patent Office Application Serial No. 18763054.6, Search Report dated Oct. 5, 2020, 12 pages.
Huawei, HiSilicon, "Evaluation of NR-SS," 3GPP TSG-RAN WG1, R1-1711860, Jun. 2017, 5 pages.
MediaTek Inc., "On the Robustness of NR SSS in Frequency Offset," 3GPP TSG-RAN WG1, R1-1710807, Jun. 2017, 2 pages.
Motorola Mobility, Lenovo, "Discussion on NR-SSS working assumption," 3GPP TSG-RAN WG1, R1-1711275, Jun. 2017, 5 pages.
Qualcomm, "Synchronization signal sequence design", 3GPP TSG RAN WG1 Meeting #89, R1-1708568, May 2017, 8 pages.
Mediatek, "NR SSS Design and Evaluation", 3GPP TSG RAN WG1 Meeting #89, R1-1707829, May 2017, 8 pages.
LG Electronics, "NR Synchronization Signal Design", 3GPP TSG RAN WG1 Meeting #88, R1-1702437, Feb. 2017, 13 pages.

* cited by examiner

FIG. 2
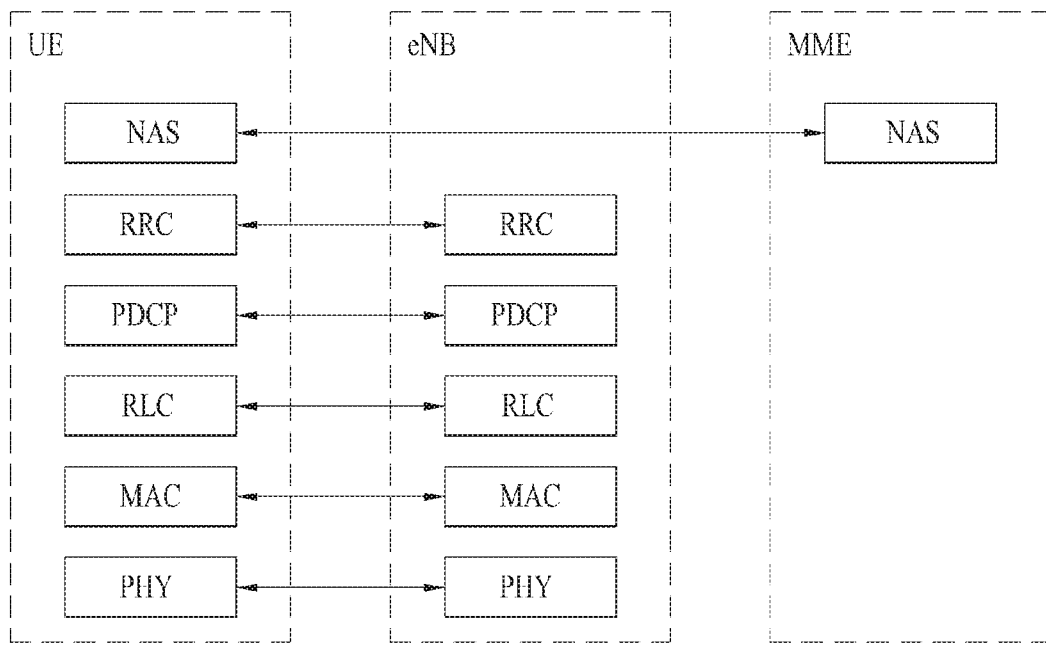
(A) CONTROL-PLANE PROTOCOL STACK
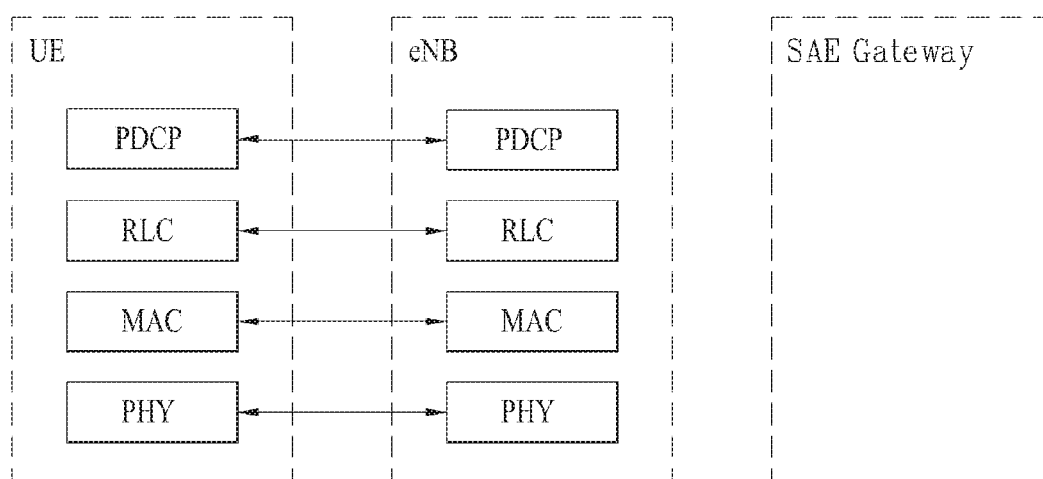
(B) USER-PLANE PROTOCOL STACK

FIG. 13

| n | $x_0$ | $x_1$ | $1-2 \cdot x_0$ | $1-2 \cdot x_1$ | $S_{1,m_0}(n)$ [ex. $m_0=5$] | $S_{2,m_1}(n)$ [ex. $m_1=1$] | $d_{SSS}(n)$ |
|---|---|---|---|---|---|---|---|
| 0 | 1 | 1 | -1 | -1 | 1 | 1 | 1 |
| 1 | 0 | 0 | 1 | 1 | 1 | 1 | 1 |
| 2 | 0 | 0 | 1 | 1 | -1 | 1 | -1 |
| 3 | 0 | 0 | 1 | 1 | 1 | 1 | 1 |
| 4 | 0 | 0 | 1 | 1 | 1 | 1 | 1 |
| 5 | 0 | 0 | 1 | 1 | 1 | 1 | 1 |
| 6 | 0 | 0 | 1 | 1 | -1 | -1 | 1 |
| 7 | 1 | 1 | -1 | -1 | 1 | 1 | 1 |
| 8 | 0 | 0 | 1 | 1 | 1 | 1 | 1 |
| 9 | 0 | 0 | 1 | 1 | 1 | 1 | 1 |
| 10 | 0 | 0 | 1 | 1 | 1 | 1 | 1 |
| 11 | 1 | 0 | -1 | 1 | 1 | 1 | 1 |
| 12 | 0 | 0 | 1 | 1 | 1 | -1 | -1 |
| 13 | 0 | 1 | 1 | -1 | -1 | -1 | 1 |
| 14 | 0 | 1 | 1 | -1 | 1 | 1 | 1 |
| 15 | 0 | 0 | 1 | 1 | 1 | 1 | 1 |
| 16 | 0 | 0 | 1 | 1 | -1 | 1 | -1 |
| 17 | 0 | 0 | 1 | 1 | 1 | 1 | 1 |
| 18 | 1 | 0 | -1 | 1 | 1 | -1 | -1 |
| 19 | 0 | 1 | 1 | -1 | -1 | 1 | -1 |
| ... | ... | ... | ... | ... | ... | ... | ... |

METHOD FOR TRANSMITTING SYNCHRONIZATION SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/002512, filed on Mar. 2, 2018, which claims the benefit of U.S. Provisional Application No. 62/467,100, filed on Mar. 4, 2017, 62/470,891, filed on Mar. 14, 2017 and 62/512,727, filed on May 31, 2017, the contents of which are all hereby incorporated by reference herein in their entirety.

TECHNICAL FIELD

The present invention relates to a method of transmitting a synchronization signal in a wireless communication system, and more particularly, to a method of transmitting a PSS (primary synchronization sequence) sequence and an SSS (secondary synchronization sequence) sequence included in a synchronization signal and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

Technical Task

A technical task of the present invention is to provide a method of transmitting a synchronization signal in a wireless communication system and an apparatus therefor. Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an SSS (secondary synchronization signal), which is transmitted by a base station in a wireless communication system includes determining a first shift index based on first and second cell identifiers for identifying a cell, and determining a second shift index based on the first cell identifier, and transmitting the SSS using a first sequence which is generated based on the first shift index and a second sequence which is generated based on the second shift index. In this case, the first shift index can be determined as K times a value determined based on the first and second cell identifiers, where K is an integer equal to or greater than 3.

In this case, a value resulting from multiplying a number of possible value of the first shift index and a number of possible value of the second shift index together may be equal to a value resulting from multiplying a number of possible value of the first cell identifier and a number of possible value of the second cell identifier together.

The SSS can be generated by multiplying elements of the first sequence and respective elements of the second sequence together.

The first sequence may be generated by applying a cyclic shift value in a unit of a plurality of samples and the second sequence may be generated by applying a cyclic shift value in a unit of 1 sample.

The SSS can be mapped to the remaining resource elements except at least one reserved resource element among resource elements for mapping the SSS.

The SSS can be transmitted to the user equipment by being mapped to an antenna port identical to an antenna port to which a primary synchronization signal is mapped.

At least one of a polynomial expression for generating the first sequence and a polynomial expression for generating the second sequence may be identical to a polynomial expression for generating a primary synchronization signal.

The first shift index may be determined by $m0=K*(3 \text{ floor}(NID(1)/112)+NID(2))$, where $m0$ is the first shift index, $NID(1)$ is the first cell identifier, and $NID(2)$ is the second cell identifier.

The second shift index may be determined by m1=(NID(1) mod 112) where m1 is the second shift index, and NID(1) is the first cell identifier.

To further achieve these and other advantages and in accordance with the purpose of the present invention, as embodied and broadly described, according to a different embodiment, a base station transmitting an SSS (secondary synchronization signal) in a wireless communication system includes a transceiver configured to transmit and receive radio signals with a user equipment, and a processor connected with the transceiver and configured to determine a first shift index based on first and second cell identifiers for identifying a cell, and to determine a second shift index based on the first cell identifier. The processor is further configured to control the transceiver to transmit the SSS to the user equipment using a first sequence which is generated based on the first shift index and a second sequence which is generated based on the second shift index. In this case, the processor is further configured to determine the first shift index as K times a value determined based on the first and second cell identifiers, where K is an integer equal to or greater than 3.

The first and second shift indexes may be determined by m0=K*(3 floor(NID(1)/112)+NID(2)) and m1=(NID(1) mod 112), where m0 and m1 are the first and second shift indexes, respectively, and NID(1) and NID(2) are the first and second cell identifiers, respectively.

To further achieve these and other advantages and in accordance with the purpose of the present invention, as embodied and broadly described, according to a different embodiment, a user equipment (UE) comprises a transceiver configured to transmit and receive radio signals with a base station, and a processor connected with the transceiver and configured to control the transceiver to receive synchronization signals including a secondary synchronization signal, SSS, from the base station. The SSS is generated using a first sequence which is generated based on a first shift index and a second sequence which is generated based on a second shift index, and the first shift index is determined based on first and second cell identifiers for identifying a cell, and the second shift index is determined based on the first cell identifier, The first shift index is K times a value determined based on the first and second cell identifiers, where K is an integer equal to or greater than 3. In an embodiment of the UE, the first and second shift indexes are m0=K*(3 floor(NID(1)/112)+NID(2)) and m1=(NID(1) mod 112), where m0 and m1 are the first and second shift indexes, respectively, and NID(1) and NID(2) are the first and second cell identifiers, respectively.

Advantageous Effects

Accordingly, the present invention provides the following effects or advantages.

According to the present invention, it is able to reduce a phenomenon of making a mistake in detecting a cell ID due to a frequency offset.

It will be appreciated by persons skilled in the art that the effects that can be achieved with the present disclosure are not limited to what has been particularly described hereinabove and other advantages of the present disclosure will be more clearly understood from the following detailed description.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 13 is a table illustrating one example of building an SSS by a base station.

MODE FOR INVENTION

Best Mode for Invention

Figure 1:
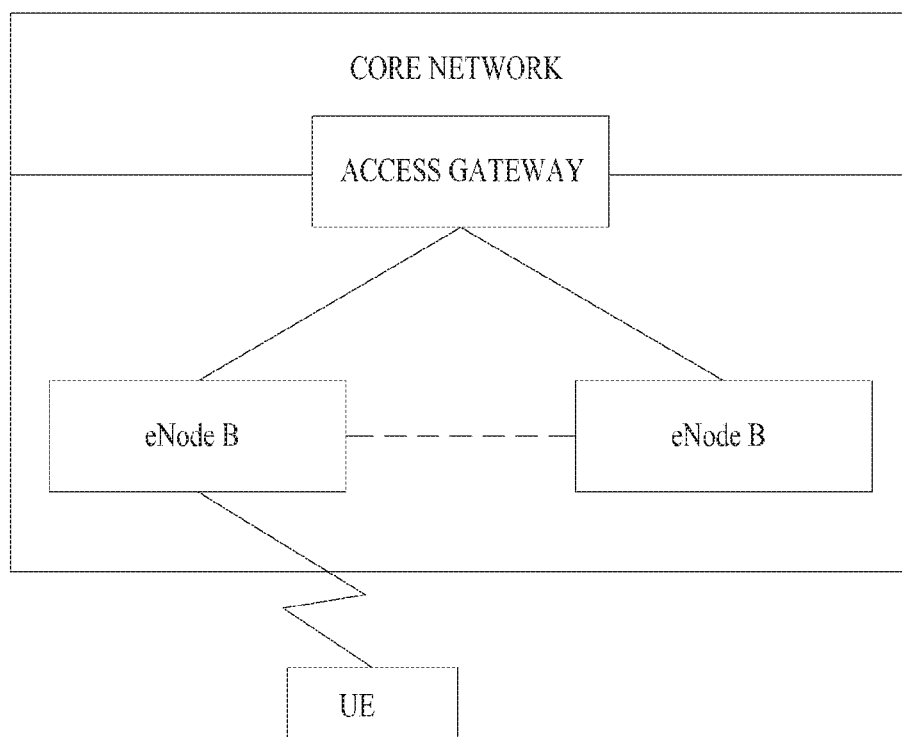
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
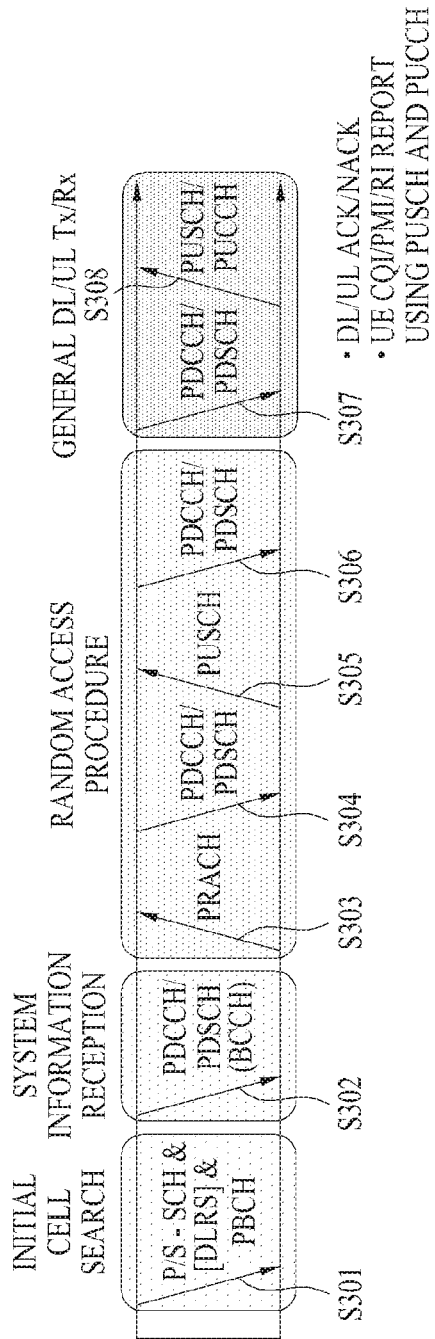
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302). If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
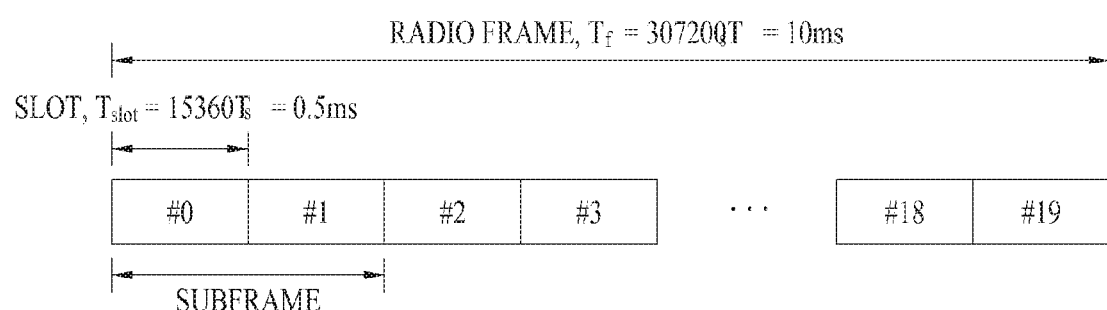
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
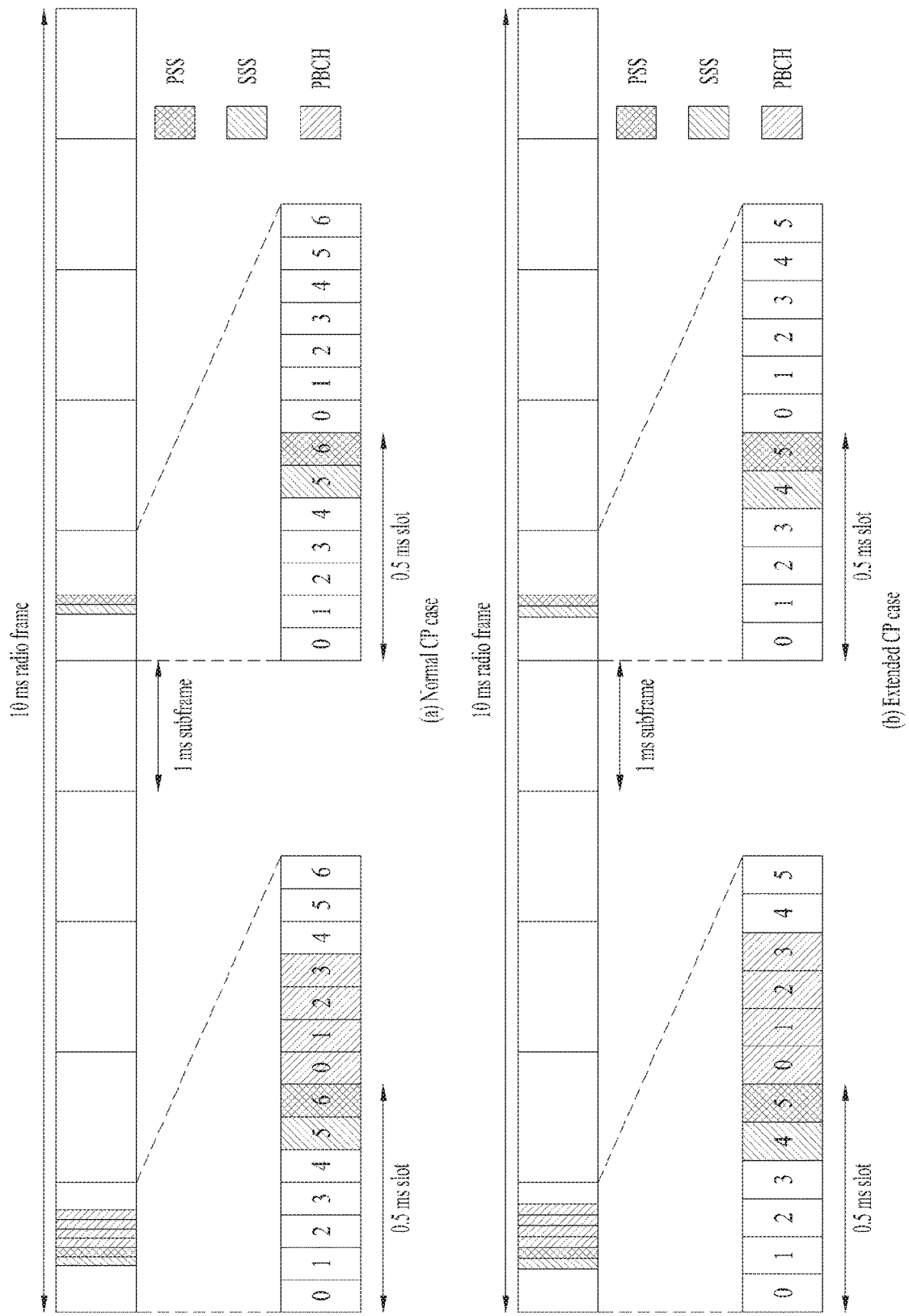
FIG. 5 illustrates a radio frame structure for transmitting an SS (synchronization signal) in LTE system.

FIG. 5 illustrates a radio frame structure for transmitting an SS (synchronization signal) in LTE system. In particular, FIG. 5 illustrates a radio frame structure for transmitting a synchronization signal and PBCH in FDD (frequency division duplex). FIG. 5 (*a*) shows positions at which the SS and the PBCH are transmitted in a radio frame configured by a normal CP (cyclic prefix) and FIG. 5 (*b*) shows positions at which the SS and the PBCH are transmitted in a radio frame configured by an extended CP.

An SS will be described in more detail with reference to FIG. 5. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 5, a PSS and an SSS are transmitted through two OFDM symbols in each radio frame. Particularly, the SS is transmitted in the first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 5, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame by detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in a total of 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the above-mentioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to UE)
Step 3: Layer 2/Layer 3 message (via PUSCH) (UE to eNB)

Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)

Step 1: RACH preamble (via PRACH) (UE to eNB)

Step 2: Random access response(RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access Radio Network Temporary Identity) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. The preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a physical resource block (PRB) and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signaling (transmitted by an eNB).

In LTE/LTE-A system, subcarrier spacing for a random access preamble (i.e., RACH preamble) is regulated by 1.25 kHz for preamble formats 0 to 3 and 7.5 kHz for preamble format 4 (refer to 3GPP TS 36.211).

Figure 6:
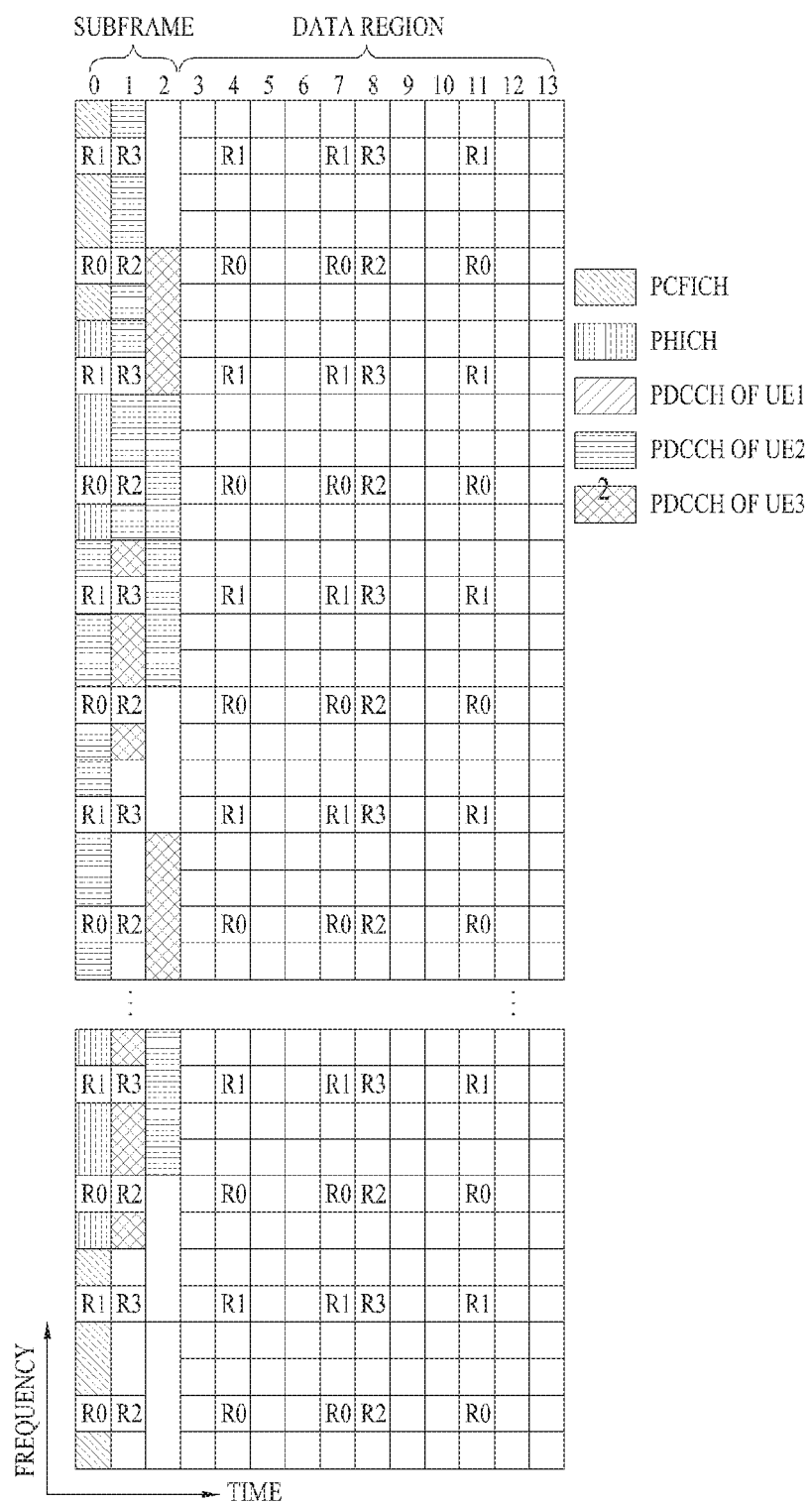
FIG. 6 illustrates a structure of a downlink radio frame in the LTE system.

FIG. 6 illustrates exemplary control channels included in a control region of a subframe in a DL radio frame.

Referring to FIG. 6, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information (CFI) about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The CFI carried by the PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more control channel elements (CCEs). The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 7:
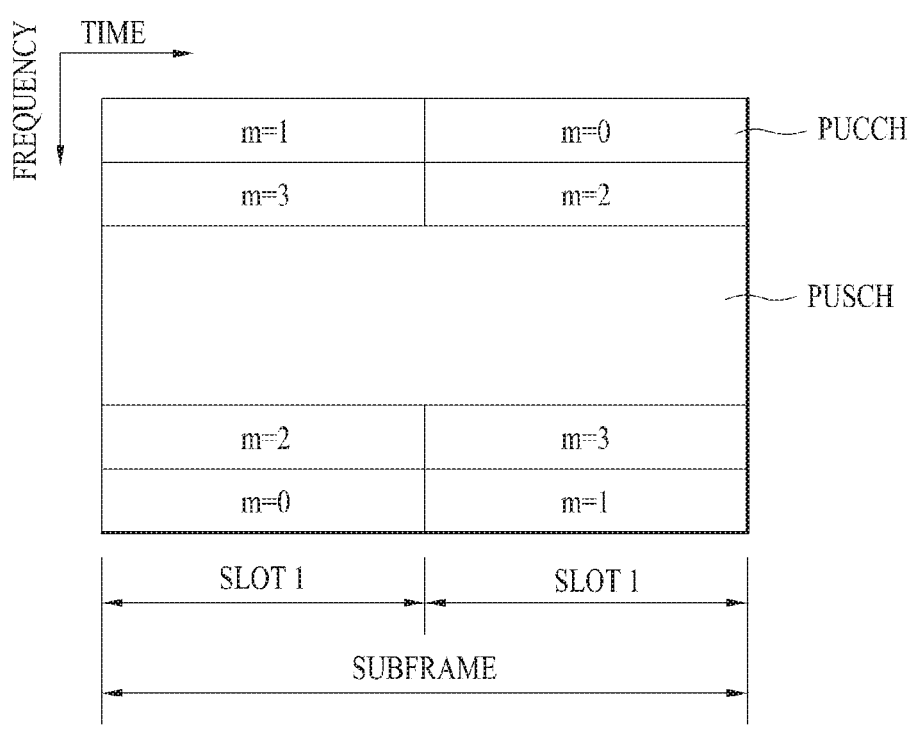
FIG. 7 illustrates a structure of an uplink subframe in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 7.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 8:
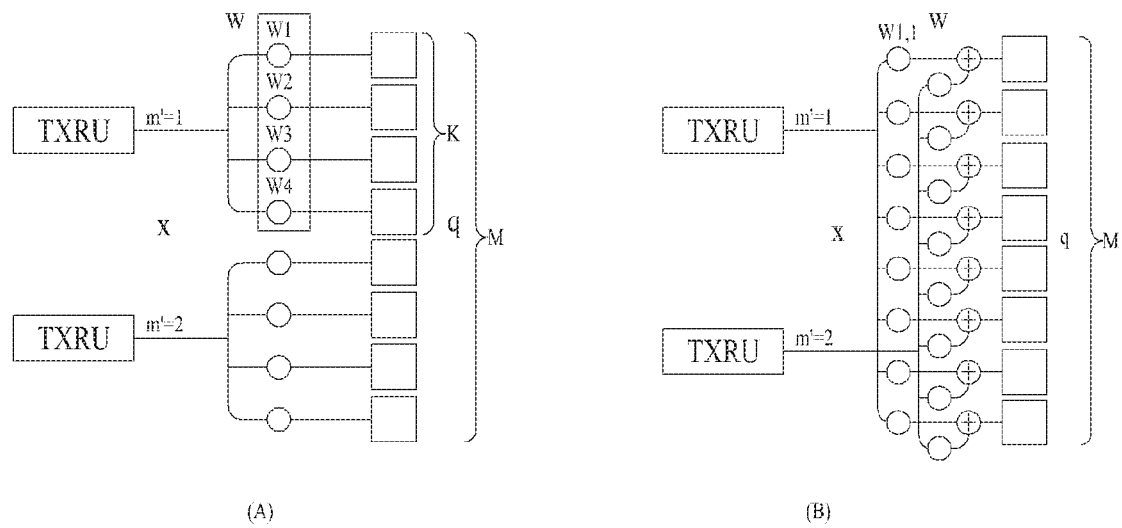
FIG. 8 illustrates examples of a connection scheme between TXRUs and antenna elements.

FIG. 8 illustrates examples of a connection scheme between TXRUs and antenna elements.

(a) of FIG. 8 illustrates that TXRU is connected to a sub-array. In this case, the antenna elements are connected to only one TXRU. Unlike (a) of FIG. 8, (b) of FIG. 8 illustrates that TXRU is connected to all antenna elements. In this case, the antenna elements are connected to all TXRUs. In FIG. 8, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 9:
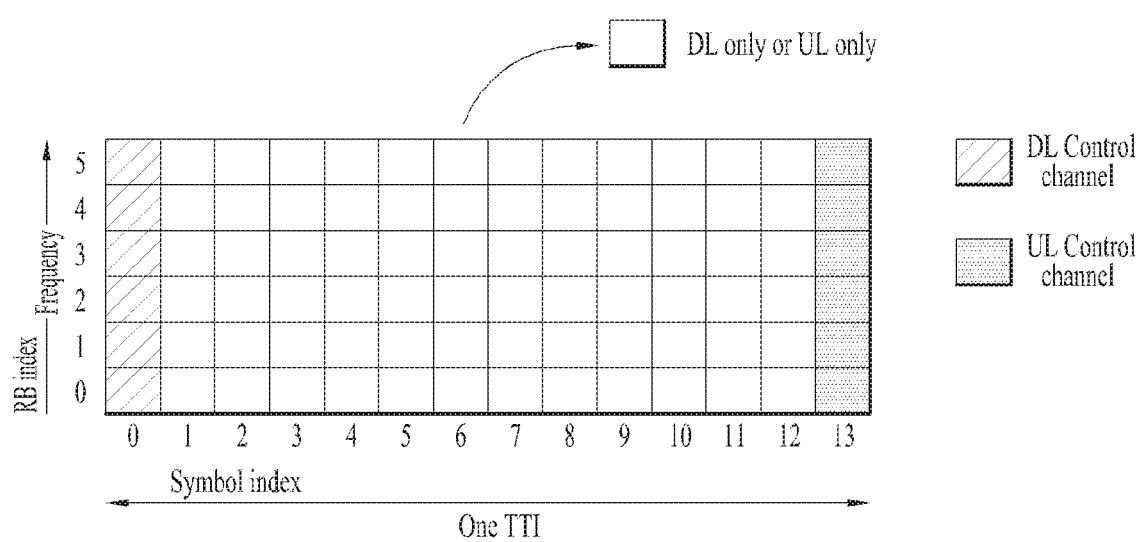
FIG. 9 illustrates an example of a self-contained subframe structure.

A self-contained subframe structure shown in FIG. 9 is considered in the fifth generation NewRAT to minimize data transmission latency in a TDD system. FIG. 9 illustrates an example of a self-contained subframe structure.

In FIG. 9, oblique line areas indicate downlink control regions and dark colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period (GP).

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period Meanwhile, a DL synchronization signal is used to obtain time synchronization and measure PCI (physical cell identity) and RRM (radio resource management) in NR system. In particular, an NR-PSS is utilized for searching for a start point of a DL signal and approximate frequency synchronization. An NR-SSS is utilized for measuring a subframe boundary, the PCI, and the RRM.

The NR-PSS and the NE-SSS are generated based on a CP-OFDM (OFDM with cyclic prefix) and each of the NR-PSS and the NE-SSS is configured by a single OFDM symbol. In this case, assume that numerology, which includes subcarrier spacing of each signal and a CP, is the same. And, the two signals are TDM (time division multiplexing) and may use the same transmission bandwidth.

Meanwhile, in the NewRAT, a synchronization signal including the NR-PSS and the NR-SSS is designed to use a bandwidth ranging from 700 MHz to 100 GHz. In this case, since a frequency property such as pathloss, delay spread, and the like varies according to a frequency band, an available frequency bandwidth may have a difference. Hence, if the NR-PSS/SSS is configured by a single numerology and a single bandwidth, it may be difficult to guarantee time synchronization acquisition to be acquired via a synchronization signal and PCI detection performance.

In order to solve the above-mentioned problem, it may be considered a method of putting a difference on numerology and a transmission bandwidth for the NR-PSS/SSS according to a frequency band. For example, it may use 15 kHz subcarrier spacing and have a bandwidth of 2.16 MHz in a band equal to or narrower than 3 GHz and it may use 30 kHz subcarrier spacing and have a bandwidth of 4.32 MHz in a band equal to or narrower than 6 GHz. And, it may use 120 kHz subcarrier spacing and have a bandwidth of 17.28 MHz in a band equal to or wider than 6 GHz. Meanwhile, it may also use 240 kHz subcarrier spacing and have a bandwidth of 34.56 MHz in a band equal to or wider than 6 GHz.

As mentioned in the foregoing description, the NR-PSS/SSS may use a wider transmission bandwidth in proportion to a subcarrier increment. By doing so, it may have a merit in that NR-PSS/SSS sequence is commonly used in each transmission bandwidth.

In the NR system, the NR-PSS is used to represent a symbol position and the NR-SSS is used to indicate a cell ID. For example, if it is necessary to have IDs as many as 1000 to indicate each cell, it is necessary to configure the NR-SSS to indicate cell IDs as many as 1000 IDs.

In this case, as mentioned in the foregoing description, in order to represent IDs more than 1000 IDs using 144 subcarriers (2.16 MHz/15 kHz=144), it is necessary to have a special configuration method of the NR-SSS.

And, it is necessary for a UE to find out information such as a subframe number or an OFDM symbol number after a start point of an OFDM symbol is identified via the NR-PSS. In this case, the information can be included in the NR-SSS to indicate the information to the UE. In particular, if the NR-PSS is used for the usage of indicating not only PCI but also a subframe number or an OFDM symbol number, it can be represented by a sequence configuration, a sequence deployment combination, and the like of the NR-SSS.

And, the NR-SSS can be transmitted via a single antenna port or two antenna ports. Since the NR-SSS is basically detected by a non-coherent detection scheme, if the number of antenna ports in use increases, detection performance can be degraded. Hence, in order to increase the number of transmission antennas, it is necessary to have a method of not deepening deterioration of the detection performance.

In the following, the present invention proposes a method of configuring a PSS sequence and an SSS sequence to satisfy the aforementioned requirements and a method of performing mapping between a sequence and an antenna port to perform transmission using a plurality of antenna ports.

<NR-PSS Sequence Design>

In an NR system, three PSS sequences in total may be defined. In this case, if an offset is fixed in time frequency domain and an M-sequence of BPSK scheme exists in frequency domain, an equation $g(x)=x^7+x^4+1$ for calculating a PSS sequence can make 145 decimal numbers.

The NR system may use three cyclic shifts in the frequency domain to make three PSS sequences. In this case, values of the cyclic shifts may correspond to 0, 43, and 86. And, 7 initial status values for calculating the PSS sequences can be represented as [1110110] and may have a sequence length of 127.

Figure 10:
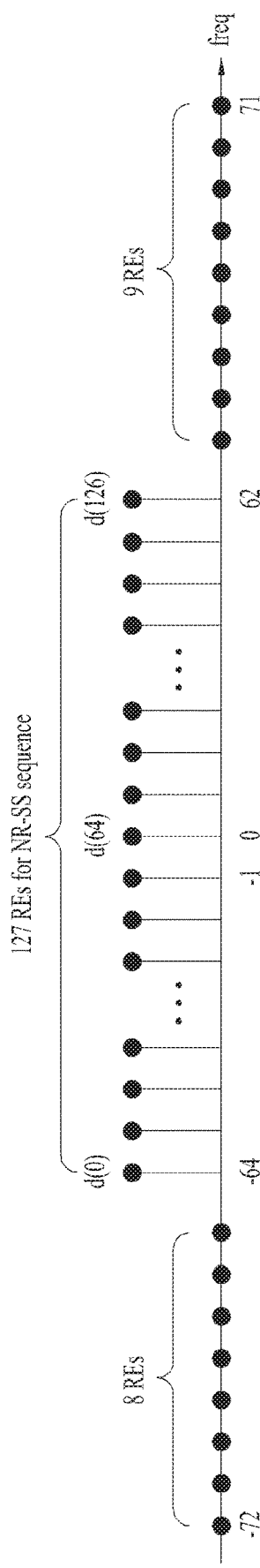
FIG. 10 is a diagram for explaining an embodiment of mapping a PSS sequence to a resource element.

In this case, the sequences are mapped to a plurality of resource elements (REs). An embodiment of mapping the sequences to a plurality of the resource elements is shown in FIG. 10. And, a bandwidth for a synchronization signal (NR-SS) can be defined as follows according to subcarrier spacing.

If subcarrier spacing corresponds to 15 kHz, NR-SS bandwidth may correspond to 2.16 MHz.

If subcarrier spacing corresponds to 30 kHz, NR-SS bandwidth may correspond to 4.32 MHz.

If subcarrier spacing corresponds to 120 kHz, NR-SS bandwidth may correspond to 17.28 MHz.

If subcarrier spacing corresponds to 240 kHz, NR-SS bandwidth may correspond to 34.56 MHz.

<Configuration of Synchronization Signal (NR-SS) Block>

Figure 11:
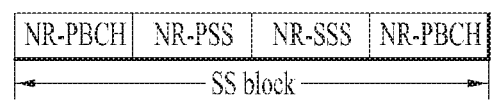
FIGS. 11 and 12 are diagrams for explaining a configuration of a synchronization signal block.

(1) Configuration of NR-PSS, NR-SSS, and NR PBCH in Time Domain of Synchronization Signal Block A set of OFDM symbols in which NR-PSS, NR-SSS, and NR PBCH are transmitted is referred to as a synchronization signal block (SS block). As shown in FIG. 11, NR-PSS, NR-SSS, and NR PBCH are transmitted using contiguous OFDM symbols. Referring to FIG. 11, each of the NR-PSS and the NR-SSS is mapped to a single OFDM symbol and the NR-PBCH is mapped to a number N of OFDM symbols. In this case, N may correspond to 2. Regarding the order of the OFDM symbols transmitting the NR-PSS, the NR-SSS, and the NR PBCH, the NR-PSS is transmitted prior to the NR-SSS. The order can be variously modified according to positions of the OFDM symbols.

(2) Resource Mapping of Synchronization Signal Block Using 24 Resource Blocks and 4 OFDM Symbols 288 resource elements are used per OFDM symbol to transmit the NR-PBCH and about 144 resource elements are used to transmit the NP-PSS and the NR-SSS. In this case, since a length of NR-PSS sequence and a length of NR-SSS sequence correspond to 127 and a sequence element included in the sequence is mapped to a single resource element, it is necessary to have 127 resource elements in total. Hence, it is possible to allocate 127 resource blocks. Among 144 resource elements included in 12 resource blocks, 17 resource elements can be defined as reserved resource elements.

Figure 12:
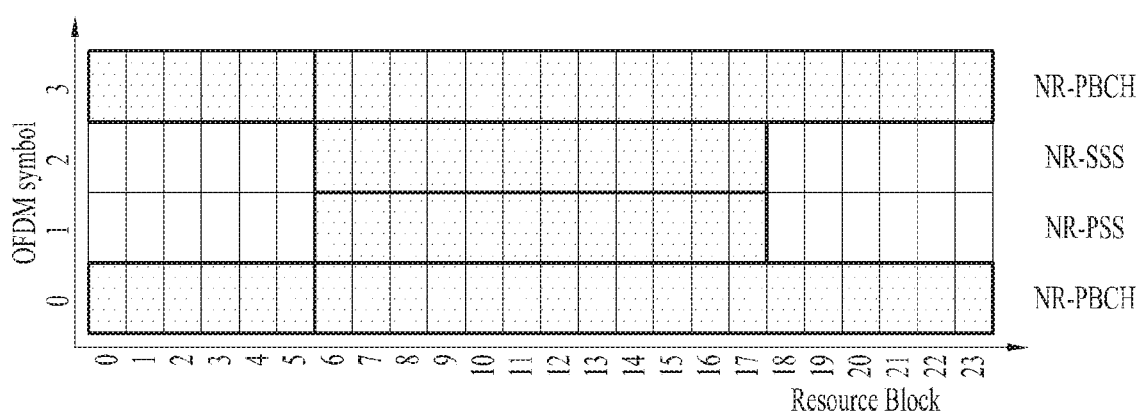

And, as shown in FIG. 12, since a bandwidth for transmitting the NR-PBCH is wider than a bandwidth for transmitting the NR-PSS or the NR-SSS as wide as two times, a center of the bandwidth for transmitting the NR-PBCH is matched with a center of the bandwidth for transmitting the NR-PSS or the NR-SSS.

<NR-SSS Sequence Design>

An NR-SSS sequence defined in the NR system is based on two M-sequences each of which has a length of 127. The final NR-SSS sequence is generated by multiplying elements included in each of the M-sequences.

In particular, the NR-SSS sequence may correspond to a scrambling sequence given by the NR-SSS and a length of the NR-SSS sequence may correspond to 127. For each index n, where n=0, . . . , 126, an element d(n) of the NR-SSS sequence has a value d(n)=+1 or d(n)=−1 and can be determined by equation 1 as follows.

$$d(n)=s1,m(n)s2,k(n) \text{ for } n=0, \ldots, 126 \quad \text{[Equation 1]}$$

In this case, s1,m(n)=±1 and s2,k(n)=±1 can be determined as cyclic shifts of two M-sequences S1(n) and S2(n) according to equation 2 as follows.

$$s1,m0(n)=S1((n+m0)\bmod 127),$$

$$s2,m1(n)=S2((n+m1)\bmod 127) \quad \text{[Equation 2]}$$

Expressed with values 0 or 1, the M-sequences may be noted x0(n) and x1(n) and then they match the sequences S1(n) and S2(n) as follows: S1(n)=1−2×0(n) and S2(n)=1−2×1(n). Equation 1 may be written as equation 3 using a first shift index m0 and a second shift index m1.

$$d(n)=[1-2\times 0((n+m0)\bmod 127)][1-2\times 1((n+m1)\bmod 127)] \text{ for } n=0, \ldots, 126 \quad \text{[Equation 3]}$$

In this case, in order to represent as many as 1000 cell IDs, 9 possible values of the first shift index m0 are applied to the first M-sequence x0(n) (or S1(n)) to generate 9 shifted sequences. And 112 possible values of the second shift index m1 are applied to the second M-sequence x1(n) (or S2(n)) to generate 112 shifted sequences. The elements s1,m0(n) of one of the 9 shifted sequences (as determined by the first shift index m0) are multiplied by the corresponding elements s2,m1(n) of one of the 112 shifted sequences (as determined by the second shift index m1) to generate one NR-SSS sequence among 1008 possible sequences in total.

The first M-sequence x0(n) may be generated using a polynomial g0 defined as $g0(x)=x^7+x^4+1$, that is $x0(j+7)=(x0(j+4)+x0(0)) \bmod 2$. The second M-sequence x1(n) may be generated using a polynomial g1 defined as $g1(x)=x^7+x+1$, that is $x1(j+7)=(x1(j+1)+x1(j)) \bmod 2$. And, an initial status value for calculating each M-sequence can be defined by [0000001], i.e. x0(0)=x1(0)=x0(1)=x1(1)=x0(2)=x1(2)=x0(3)=x1(3)=x0(4)=x1(4)=x0(5)=x1(5)=0 and x0(6)=x1(6)=1.

Meanwhile, in case of a previously proposed SSS sequence, the first M-sequence is generated based on m0 of equation 4 below, and the second M-sequence is generated based on m1 of equation 4 below. In this case, NID(1) corresponds to a value obtained from the NR-SSS sequence to indicate part of a cell ID and has integer values ranging from 0 to 335. NID(2) corresponds to a value obtained from the NR-PSS sequence to indicate part of the cell ID and has integer values ranging from 0 to 2. In particular, the value NIDcell of the cell ID can be obtained by an equation NIDcell=3 NID(1)+NID(2).

$$m0=3 \text{ floor}(NID(1)/112)+NID(2)$$

$$m1=(NID(1)\bmod 112)+m0+1 \quad \text{[Equation 4]}$$

In particular, in case of an index of a proposed SSS sequence, the m0 corresponding to the first M-sequence has index of [0~8] and the m1 corresponding to the second M-sequence has indexes of [1~112], [2~113], [3~114], [4~115], [5~116], [6~117], [7~118], [8~119], and [9~120] depending on m0.

In particular, a cyclic shift of 1 sample unit is applied to both the first M-sequence and the second M-sequence according to m0 and m1. However, although a frequency offset is compensated in some degree via PSS in an initial access step, if a big residual frequency offset value occurs (e.g., if a residual frequency offset is equal to or greater than 50% of subcarrier spacing), it may have an effect such that sequences mapped to each resource element are moved to an adjacent resource element in frequency domain. In particular, when an SSS sequence is mapped to a plurality of resource elements in the frequency domain and is transmitted to a UE via an OFDM modulation procedure, the SSS signal, which is transmitted to the UE via a radio channel, is shifted to an adjacent resource element due to the frequency offset. The UE attempts to detect a cell ID from the received SSS signal while not recognizing the above-mentioned situation. As a result, it is highly probable that the UE detects a cell ID different from a cell ID to be originally detected.

Hence, the present invention proposes a method of designing an NR-SSS sequence robust to frequency offset. In this case, assume that the NR-SSS sequence is mapped to a frequency axis via a BPSK modulation and the NR-SSS sequence is transmitted through a single OFDM symbol.

According to embodiments of the present invention, when an SSS sequence is configured by combining the two M-sequences with each other, at least one of the two M-sequences is shifted as much as K units to configure an SSS sequence set. In this case, the number K can be defined by an integer value greater than 1. In the following, methods according to such embodiments are explained in detail.

1. Embodiment 1

According to the embodiment 1, a sequence set can be configured by applying a shift value of a different unit to each sequence. For example, in case of generating sequences as many as a number greater than ½ of a sequence length, shift is applied in a unit of 1 sample. On the contrary, in case of generating sequences as many as a number less than ½ of a sequence length, shift is applied in a unit of an integer value greater than 1 sample. Specifically, in case of generating sequences as many as M=112 using M-sequence of length N=127 such as NR-SSS, shift is applied in a unit of one sample. And, in case of generating sequences as many as (Q<N/2) using M-sequence of a length N, shift is applied in a unit of at least 2 samples. When shift indexes of M-sequence correspond to m0 and m1, if sequences are generated as many as a number smaller than N/2 using M-sequence of a length of N, the shift indexes are defined to have an index increasing in a unit of K samples. If sequences are generated as many as a number greater than N/2, the shift indexes are defined to have an index increasing in a unit of one sample. The following Equation 5 corresponds to an equation for generating a shift index according to the above-mentioned method.

$$m0=K^*(3 \text{ floor}(NID(1)/M)+NID(2))$$

$$m1=(NID(1)\bmod M)+m0+1 \quad \text{[Equation 5]}$$

Referring to equation 5, it can be seen that a legacy equation for generating a shift index m0 is scaled as much as K times. This is because a polynomial expression g0(x) for calculating a first M-sequence of NR-SSS and a polynomial expression g(x) for calculating a sequence of NR-PSS are common: $g(x)=g0(x)=x^7+x^4+1$. In particular, scaling is performed on m0 corresponding to a cyclic shift index associated with g0(x), which is overlapped with the polynomial expression g(x) for calculating a sequence of NR-PSS, among cyclic shift indexes used for NR-SSS. If m0 is scaled, it is possible to increase capability of detecting a synchronization signal.

In this case, a minimum value of K corresponds to 2 and a maximum value of the K may correspond to floor (N/Q). For example, if a length of N=127 is equally divided by Q=9, it may have a value of maximum space capable of being shifted. In this case, since K=floor (127/9)=14 is satisfied, the shift index m0 has an index increasing in a unit of 14 samples.

In the NR system, if more sequences are generated in addition to 1000 cell IDs to indicate a half frame boundary, a maximum value of K can be defined by a value smaller than the previously defined value (e.g., K=floor(127/18)=7). In this case, a set of time for which the L number of synchronization signal blocks (SS blocks) are transmitted is defined as a synchronization signal burst set (SS burst set). The synchronization signal burst set (SS burst set) is configured such that the number L of synchronization signal blocks (SS blocks) are transmitted within 5 ms. The synchronization signal burst set (SS burst set) can be transmitted with a period of minimum 5 ms.

If the synchronization signal burst set (SS burst set) is transmitted with a period of 5 ms, the SS burst set is transmitted so as to include least one synchronization signal block in the first half 5 ms and the latter half 5 ms within a frame of a length of 10 ms. This is referred to as a half frame boundary. If a different sequence is used to transmit an SS burst set during time for which the SS burst set is transmitted (i.e. the first half 5 ms and the latter half 5 ms), it is possible to configure a UE to detect the half frame boundary.

In particular, sequences as many as X are generated for representing cell IDs in a legacy system, whereas sequences as many as 2X are required in the NR system. Hence, if an M-sequence generates sequences as many as M, it is necessary for another M-sequence to generate sequences as many as 2Q to finally generate sequences as many as 2X.

Meanwhile, if m1 has an offset as much as m0 in the aforementioned equation, a value of m1 may exceed a maximum length of a sequence (e.g., N=127). In this case, as shown in equation 6 in the following, it is possible to configure the index m1 not exceeding the maximum length of the sequence via modular arithmetic.

$$m0 = K*(3 \text{ floor}(NID(1)/M) + NID(2))$$

$$m1 = ((NID(1) \bmod M) + m0 + 1) \bmod N \qquad \text{[Equation 6]}$$

On the contrary, as shown in the following equation 7, m1 can be configured regardless of m0.

$$m0 = K*(3 \text{ floor}(NID(1)/112) + NID(2))$$

$$m1 = (NID(1) \bmod 112) \qquad \text{[Equation 7]}$$

In this case, if a residual frequency offset has an integer value equal to or greater than +/−1 of subcarrier spacing, it is preferable to configure K with a value greater than 3. For example, K may correspond to 4 or 5.

2. Embodiment 2

In embodiment 2, it is possible to configure a sequence set by shifting sequences, which are obtained by combining two M-sequences, in a unit of K. In this case, K may correspond to an integer greater than 1.

In particular, when a shift index value applied to an M-sequence is generated, an index increases in a unit of K samples. And, a different offset value can be applied to a shift index applied to each M-sequence. Equation 8 in the following shows an example of generating a shift index configured by the above-mentioned method.

$$m0 = K*(3 \text{ floor}(NID(1)/M) + NID(2))$$

$$m1 = K*(NID(1) \bmod M) + m0 + 1 \qquad \text{[Equation 8]}$$

As shown in equation 8, if m1 has an offset as much as m0, a value of m1 may exceed a maximum length (e.g., N=127) of a sequence. In this case, as shown in the following equation 9, it is possible to configure the index m1 not to exceed the maximum length of the sequence by applying modular arithmetic.

$$m0 = K*(3 \text{ floor}(NID(1)/M) + NID(2))$$

$$m1 = (K*(NID(1) \bmod M) + m0 + 1) \bmod N \qquad \text{[Equation 9]}$$

Meanwhile, as shown in the following equation 10 or equation 11, m1 can be configured regardless of m0.

$$m0 = K*(3 \text{ floor}(NID(1)/112) + NID(2))$$

$$m1 = K*(NID(1) \bmod 112) \qquad \text{[Equation 10]}$$

$$m0 = K*(3 \text{ floor}(NID(1)/112) + NID(2))$$

$$m1 = (K*(NID(1) \bmod 112)) \bmod N \qquad \text{[Equation 11]}$$

FIG. 13 shows one way of building an SSS in accordance with equations 1 and 2 (or equation 3). How the shift indexes m0 and m1 are applied is illustrated in the specific case where m0=5 and m1=1 (corresponding to NID(1)=NID(2)=1 if equation 7 is used). A unique sequence d(n), or dSSS(n), is obtained, that can be recognized by a receiving UE to find the corresponding shift indexes m0 and m1 and derive the cell identifiers NID(1) and NID(2).

3. Embodiment 3

In embodiment 3 according to the present invention, a sequence for NR-SSS is generated by multiplying elements of heterogeneous sequences. In this case, the heterogeneous sequence for generating the NR-SSS can include a PN (pseudo-noise) sequence, an M-sequence, a Gold-sequence, a Golay-sequence, a ZC-sequence, and the like.

And, a sequence of the NR-SSS can represent the number N of hypothesis values and the hypothesis value is configured by combining sequences constructing the NR-SSS sequence. And, the hypothesis value can also be configured by combining a seed value, a root index, a cyclic shift, and the like which are applied according to each sequence. The hypothesis value can be used for representing a cell ID, a symbol index, a subframe index, and the like.

In this case, as a representative example, the NR-SSS sequence can be configured by multiplying elements of a ZC sequence and an M-sequence together. The N hypothesis values are configured by combining a root index and/or a cyclic shift of the ZC-sequence with a seed value and/or a cyclic shift of the M-sequence.

In the following, a method of configuring the NR-SSS sequence using a heterogeneous sequence is explained in detail based on the aforementioned description.

(1) A ZC-sequence uses a single root index and applies a plurality of cyclic shifts. And, an M-sequence applies a plurality of the cyclic shifts using a single seed value. A detail example of the above-mentioned method is described in the following.

An NR-SSS defines a null resource element (RE) to minimize interference with an adjacent band signal. In particular, the NR-SSS defines a reserved resource element. Subsequently, a sequence is mapped to resource elements rather than the null resource element in a transmission bandwidth defined for transmitting the NR-SSS. In this case, a length of the sequence can be configured by a prime number.

For example, when the NR-SSS is configured, if 144 resource elements are used, the length of the sequence may correspond to a prime number among numbers smaller than 144. If 17 resource elements are used as null resource elements (i.e. reserved resource elements) among the 144 resource elements, a sequence of a length of 127 can be mapped to 127 resource elements.

Meanwhile, according to the embodiment 3 (1), when an NR-SSS sequence is configured using an M-sequence as a cover sequence for a ZC-sequence, a cyclic shift is applied to each sequence. For example, the ZC sequence generates 127 sequences by applying a cyclic shift in a unit of 1 sample and the M-sequence generates 8 sequences by applying cyclic shift in a unit of 15 or 16 samples. In particular, it may be able to generate 1016 (=127*8) hypothesis values in total using a combination of the generated sequences. The generated sequences can be mapped to a frequency element of an OFDM symbol.

The method of generating sequences according to the embodiment 3 (1) is explained in detail in the following. Sequences d(0), . . . , d(126) for the NR-SSS can be configured using an M-sequence for a ZC-sequence as a cover sequence. In particular, as shown in the following equation 12, an NR-SSS sequence can be generated by multiplying elements of the ZC-sequence and the M-sequence together.

$$d(n)=X_{w,u}(n)=X_{w,m\_seq}(n) \cdot X_{u,zc\_seq}(n), n=0, \ldots N_{zc}-1 \quad \text{[Equation 12]}$$

In this case, as mentioned in the foregoing description, since the ZC-sequence can generate 127 sequences by applying cyclic shift in a unit of 1 sample and the M-sequence can generate 8 sequences by applying cyclic shift in a unit of 15 or 16 samples, it may be able to generate 1016 hypothesis values in total. In particular, it may be able to generate $N_{CS,m\_seq} \times NCS,ZC\_seq = 8 \times 127 = 1016$ number of hypothesis values.

And, the M-sequence $xm\_seq(n)$ can be calculated via a polynomial expression of an m order. For example, a 7th polynomial expression for calculating the M-sequence can be defined as $g(D)=D7+D6+1$. And, the M-sequence $xm\_seq(n)$ can be modulated via BPSK modulation.

And, a sequence generated by applying cyclic shift to the M-sequence can be obtained by the following equation 13.

$$xw,m\_seq(n)=xm\_seq((n-Cw) \text{mod } Nzc), n=0, \ldots, Nzc-1 \quad \text{[Equation 13]}$$

In this case, Cw corresponds to an integer multiple of the M-sequence to which cyclic shift is applied and can be obtained by the following equation 14.

$$C_w = v \cdot N_{CS,m\_seq} v=0,1 \ldots \lfloor N_{ZC}/N_{CS,m\_seq} \rfloor -1, \quad N_{CS,m\_seq} \neq 0 \quad \text{[Equation 14]}$$

Hence, the M-sequence xw, m_seq(n) calculated by the above-mentioned procedure may correspond to a part of a final M-sequence.

In the following, a method of generating a ZC-sequence is described. The ZC-sequence can be calculated by the following equation 15.

$$X_{u,ZC\_seq}(n) = e^{-j\pi u \frac{n(n+1)}{N_{ZC}}}, n = 0, \ldots, N_{ZC}-1 \quad \text{[Equation 15]}$$

In this case, u and NZC included in a root sequence may correspond to a relative prime where the greatest common denominator is 1. The number u may have a value smaller than NZC. In particular, it may satisfy u<NZC.

And, a sequence generated by applying cyclic shift to the ZC-sequence can be obtained by the following equation 16.

$$X_{w,ZC\_seq}(n)=X_{ZC\_seq}((n-C_v) \text{mod } N_{zc}), n=0, \ldots N_{zc}-1 \quad \text{[Equation 16]}$$

In this case, Cv corresponds to an integer multiple of the ZC-sequence to which cyclic shift is applied and can be obtained by the following equation 17.

$$C_v = v \cdot N_{CS,ZC\_seq} v=0,1, \ldots \lfloor N_{ZC}/N_{CS,ZC\_seq} \rfloor -1, \quad N_{CS,ZC\_seq} \neq 0 \quad \text{[Equation 17]}$$

Hence, the ZC-sequence xu, v, ZC_seq(n) calculated by the above-mentioned procedure may correspond to a part of a final ZC-sequence.

(2) In embodiment 3 (2), a ZC-sequence uses a plurality of root indexes and a frequency domain cyclic shift is not applied. On the contrary, an M-sequence uses a single seed value and applies a plurality of cyclic shifts. The M-sequence corresponding to a binary sequence is modulated via BPSK modulation. A modulated M-sequence and a modulated ZC-sequence are multiplied element-by-element to generate a final NR-SSS sequence.

In this case, a hypothesis value capable of being represented can be determined according to a length of an NR-SSS sequence. For example, the length of the NR-SSS can be configured by 127, 255, or the like. In this case, a cyclic shift may be applied to the M-sequence in a sample unit. For example, if cyclic shift is applied to an M-sequence of a length of 127 in a unit of 1 sample, it may be able to generate 127 sequences. A ZC-sequence can generate various sequences by applying various root indexes. For example, the ZC-sequence can generate 8 sequences by applying 8 root indexes. Consequently, it may be able to generate an NR-SSS using a combination of sequences generated according to a cyclic shift of the M-sequence and sequences generated according to a root index of the ZC-sequence. In particular, it may be able to generate 1016 sequences in total using a combination of 127 M-sequences generated according to cyclic shift and 8 ZC-sequences generated according to a root index.

A method of generating sequences is explained in detail with reference to the embodiment 3 (2) in the following. Sequences d(0), . . . , d(126) for an NR-SSS can be configured by using an M-sequence for a ZC-sequence as a cover sequence. In particular, as shown in the following equation 18, the NR-SSS sequence can be generated by multiplying elements of the ZC-sequence and elements of the M-sequence together.

$$d(n)=X_{w,u}(n)=X_{w,m\_seq}(n) \cdot X_{u,zc\_seq}(n), n=0, \ldots N_{zc}-1 \quad \text{[Equation 17]}$$

In this case, as mentioned in the foregoing description, since the ZC-sequence can generate 8 sequences according to a root index and the M-sequence can generate 127 sequences by applying cyclic shift in a unit of 1 sample, it is possible to generate 1016 hypothesis values in total. In particular, it is possible to generate a number $N_{CS,m\_seq} \times N_{Root,ZC\_seq} = 127 \times 8 = 1016$ of hypothesis values.

And, the number of identifiers capable of being identified via the NR-SSS can be calculated using the following equation 19.

$$N_{ID}=w+N_{ZC} \cdot U, w=0 \ldots N_{ZC}-1, N_{ZC}=127, U=0, \ldots \lfloor 1015/N_{ZC} \rfloor \quad \text{[Equation 19]}$$

Meanwhile, values of U corresponding to each root index are shown in table 1 in the following.

TABLE 1

| | U | | | | | | | |
|---|---|---|---|---|---|---|---|---|
| | 0 | 1 | 2 | 3 | 4 | 5 | 6 | 7 |
| u (Root Index) | 51 | 76 | 27 | 100 | 23 | 104 | 52 | 75 |

Meanwhile, M-sequence sm_seq(n) can be determined according to the following equation 20.

$$s_{m\_seq}(n+7)=(s_{m\_seq}(n+6)+s_{m\_seq}(n))\mod 2, 0 \leq n \leq 127$$

$$s_{m\_seq}(0)=1, s_{m\_seq}(1)=s_{m\_seq}(2)=s_{m\_seq}(3)=s_{m\_seq}(4)=s_{m\_seq}(5)=s_{m\_seq}(6)=0$$

[Equation 20]

And, when a sequence is modulated via BPSK modulation and a cyclic shift is applied to the sequence, the sequence can be determined according to the following equation 21.

$$X_{w,m\_seq}(n)=1-2s_{m\_seq}((n+w)\mod N_{zc}), n=0, \ldots N_{zc}-1$$

[Equation 21]

And, the ZC-sequence can be generated using the following equation 22.

$$X_{u,ZC\_seq}(n) = e^{-j\pi u \frac{n(n-1)}{N_{ZC}}}, n = 0, \ldots, N_{ZC} - 1$$

[Equation 22]

<Method of Mapping a Generated Synchronization Signal Sequence to Resource Element>

A sequence d(n) can be mapped to a resource element according to the following equation 23.

$$a_k = d(n), n = 0, \ldots, 126$$

$$k = n - 63 + \frac{N_{RB}^{DL} N_{sc}^{RB}}{2}$$

[Equation 23]

In this case, $N_{RB}^{DL}$ corresponds to the number of resource blocks per DL resource and $N_{sc}^{RB}$ corresponds to the number of subcarriers per resource block.

And, a resource element (k,l) may not be used for transmitting an NR-SS or can be reserved according to the following equation 24.

$$k = n - 63 + \frac{N_{RB}^{DL} N_{sc}^{RB}}{2}$$

$$n = -8, -7, \ldots, -1, 127, 128, \ldots, 135$$

[Equation 24]

<Method of Mapping Generated Synchronization Signal to Antenna Port>

According to the embodiment of the present invention, an antenna port for transmitting an NR-PSS can also be used for transmitting an NR-SSS.

In this case, the NR-SSS can be transmitted via one or two antenna ports. If the NR-SSS is transmitted through two antenna ports, a sequence can be mapped to each of the two antenna ports. In this case, as a method of mapping the sequence to the antenna ports, it may apply FDM (frequency division multiplexing) or CDM (code division multiplexing).

In the following, an embodiment of transmitting the NR-SSS through two antenna ports is explained in detail.

1. Embodiment 1

When the same sequence is transmitted via each of antenna ports, as a method of identifying each of the transmission antenna ports, it may be able to apply a different time domain cyclic shift to the same sequence which is mapped to each of the antenna ports. For example, an NR-SSS sequence d(n) is mapped to a first transmission antenna port and a time domain cyclic shift can be applied to the NR-SSS sequence d(n) in a second transmission antenna port. If an NR-SSS is configured by CP-OFDM, a DFT sequence D(n) can be used as the time domain cyclic shift which is applied to the NR-SSS sequence d(n). For example, it may satisfy D(n)=(−1)n.

2. Embodiment 2

Meanwhile, if FDM is applied, each of elements (sub-elements) constructing a sequence can be mapped to each of antenna ports. In this case, it is possible to apply an interleaved type scheme corresponding to a scheme of grouping and using subcarriers having the same frequency space or a cluster type scheme corresponding to a scheme of grouping and using the N number of continuous subcarriers.

The above-mentioned embodiment is explained in detail in the following. When an NR-SSS is configured using the number N of sequences and each of the N sequences is mapped to a frequency element, it is possible to configure each of elements of a sequence to be mapped to an antenna port. For example, if an NR-SSS is configured using two sequences (e.g., S1(n) and S2(n)) and each sequence is multiplexed using the interleaved scheme, such multiplexing may be performed as d(n)=[d(0) d(1) . . . d(2N−1)]=[S1(0) S2(0) S1(1) S2(1) . . . S1(N−1) S2(N−1)]. In this case, the N elements of the first half can be mapped to a first antenna port and the N elements of the latter half can be mapped to a second antenna port. In other words, it is possible to perform mapping as follows.

Antenna port 1: [d(0) d(1) d(2) d(3) . . . d(N−2) d(N−1) 0 0 0 0 . . . 0 0]

Antenna port 2: [0 0 0 0 . . . 0 0 d(N) d(N+1) d(N+2) d(N+3) . . . d(2N−2) d(2N−1)]

A different embodiment is explained in detail in the following. The elements of the NR-SSS sequence d(n) are grouped by two groups and the groups can be sequentially mapped to each of the antenna ports. In this case, the groups can be sequentially mapped to a frequency index according to an index of d(n).

As shown in the following, a sequence can be mapped to frequency elements of each antenna port. In this case, 0 indicates that a sequence is not applied.

Antenna port 1: [d(0) d(1) 0 0 d(4) d(5) 0 0 . . . d(2N−4) d(2N−3) 0 0]

Antenna port 2: [0 0 d(2) d(3) 0 0 d(6) d(7) . . . 0 0 d(2N−2) d(2N−1)]

According to the last specific embodiment, each of sequences of the NR-SSS can be multiplexed using a group-unit interleaved scheme. For example, as shown in the following, two elements are grouped and are multiplexed using the interleaved scheme.

[d(0) d(1) . . . d(2N−1)]=[S1(0) S1(1) S2(0) S2(1) . . . S1(N−2) S1(N−1) S2(N−2) S2(N−1)]

The multiplexed NR-SSS sequences are mapped to each of the antenna ports using the interleaved scheme.

Antenna port 1: [d(0) 0 d(2) 0 d(5) 0 d(6) 0 ... d(2N−2) 0]

Antenna port 2: [0 d(1) d(3) 0 d(4) 0 d(7) 0 ... d(2N−1)]

A UE in accordance with embodiments of the present disclosure receives the synchronization signals from a base station, i.e. the PSS and the SSS. On that basis, the UE can determine the first and second cell identifiers NID(1), NID(2) which identify a cell served by the base station.

For example, the UE may first recover the value of NID(2) by decoding the PSS and identifying which one of the cyclic shifts 0, 43, and 86 has been applied by the base station to the M-sequence generated by $g(x)=x^7+x^4+1$, given that the value of the cyclic shift for the PSS is 43×NID(2), where NID(2)=0, 1 or 2. Then, the UE may decode the SSS and determine the shift indexes m0 and m1. Knowing NID(2), the shift index m0 yields floor(NID(1)/M), and (NID(1) mod M), can be determined from the shift index m1 using the applicable equation among the above-mentioned equations 5-11, with, e.g., M=112. The cell identifier NID(1) is then obtained as NID(1)=M×floor(NID(1)/M)+(NID(1) mod M).

Figure 14:
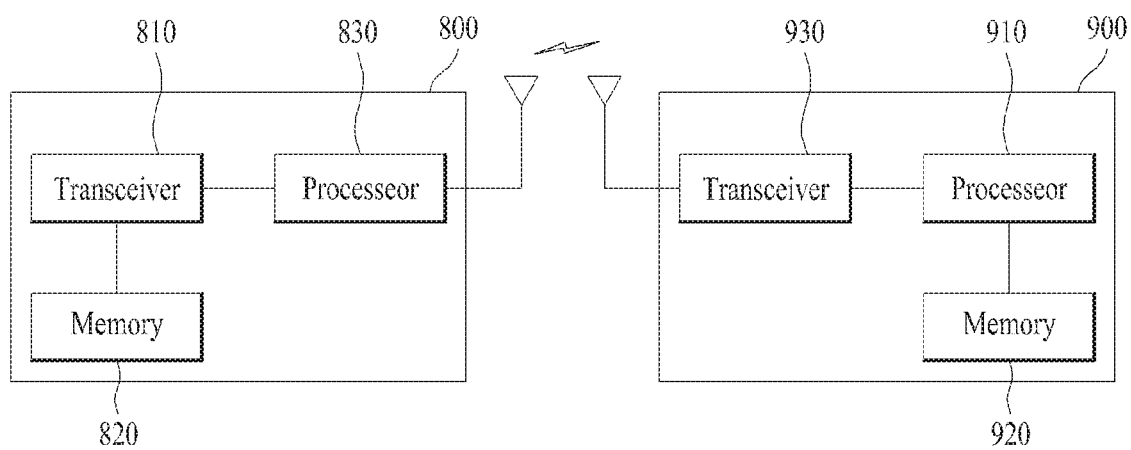
FIG. 14 shows a wireless communication system to implement an embodiment of the present disclosure.

Referring to FIG. 14, a wireless communication system to implement an embodiment of the present invention includes a base station 800 and a UE 900.

The base station 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

The UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

The base station 800 and the UE 900 are shown as having the configuration illustrated in FIG. 11, for the convenience of description. Some modules may be added to or omitted from the base station 800 and the UE 900. In addition, a module of the base station 800 or UE 900 may be divided into more modules. The processors 810, 910 are configured to perform operations according to the embodiments of the present disclosure described before with reference to the drawings. Specifically, for detailed operations of the processors 810, 910, the descriptions of FIGS. 1 to 12 may be referred to.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of transmitting a synchronization signal in a wireless communication system and an apparatus therefor are explained centering on the example applied to the 5th generation New RAT system, the method and the apparatus can also be applied to various wireless communication systems besides the 5th generation New RAT system.

The invention claimed is:

1. A method for transmitting a primary synchronization signal (PSS) and a secondary synchronization signal (SSS) by a base station in a wireless communication system, the method comprising:
   transmitting, to a user equipment (UE), the PSS; and
   transmitting, to the UE, the SSS based on a first sequence multiplied by a second sequence, the first sequence based on a first shift index and the second sequence based on a second shift index,
   wherein the first shift index is equal to K*(3 floor(NID(1)/112)+NID(2)), and
   wherein the second shift index is equal to NID(1) mod 112,
   where NID(1) is the first cell identifier, NID(2) is the second cell identifier, and K is an integer greater than 3 and less than or equal to 14,
   wherein a length for the SSS based on the first sequence multiplied by the second sequence is 127,
   wherein a number of the first sequence is 9 and a number of the second sequence is 112,
   wherein a first polynomial expression for generating the first sequence is identical to a polynomial expression for generating the PSS, and
   wherein a second polynomial expression for generating the second sequence is different from a polynomial expression for generating the PSS.

2. The method of claim 1, wherein K=5.

3. The method of claim 1, wherein the SSS is generated by multiplying elements of the first sequence by respective elements of the second sequence.

4. The method of claim 1, wherein the SSS is mapped to resource elements not reserved for other purposes.

5. The method of claim 1, wherein the SSS is being mapped to an antenna port identical to an antenna port to which the PSS is mapped.

6. A base station (BS) for transmitting a primary synchronization signal (PSS) and a secondary synchronization signal (SSS) in a wireless communication system, the BS comprising:
   a transceiver; and
   a processor operatively connected to the transceiver and configured to:
      transmit, to a user equipment (UE), the PSS; and
      transmit, to the UE, the SSS based on a first sequence multiplied by a second sequence, the first sequence based on a first shift index and the second sequence based on a second shift index,
   wherein the first shift index is equal to K*(3 floor(NID(1)/112)+NID(2)), and
   wherein the second shift index is equal to NID(1) mod 112,
   where NID(1) is the first cell identifier, NID(2) is the second cell identifier, and K is an integer greater than 3 and less than or equal to 14,
   wherein a length for the SSS based on the first sequence multiplied by the second sequence is 127,
   wherein a number of the first sequence is 9 and a number of the second sequence is 112,
   wherein a first polynomial expression for generating the first sequence is identical to a polynomial expression for generating the PSS, and
   wherein a second polynomial expression for generating the second sequence is different from a polynomial expression for generating the PSS.

7. The BS of claim 6, wherein K=5.

8. The BS of claim 6, wherein the SSS is being mapped to an antenna port identical to an antenna port to which the PSS is mapped.

9. The BS of claim 6, wherein the SSS is generated by multiplying elements of the first sequence by respective elements of the second sequence.

10. The BS of claim 6, wherein the SSS is mapped to resource elements not reserved for other purposes.

11. A method for receiving a primary synchronization signal (PSS) and a secondary synchronization signal (SSS) by a user equipment in a wireless communication system, the method comprising:
   receiving, from a base station (BS) the PSS;
   receiving, from the BS, the SSS based on a first sequence multiplied by a second sequence, the first sequence based on a first shift index and the second sequence based on a second shift index; and
   performing a synchronization based on the PSS and the SSS,
   wherein the first shift index is equal to K*(3 floor(NID(1)/112)+NID(2)), and
   wherein the second shift index is equal to NID(1) mod 112,
   where NID(1) is the first cell identifier, NID(2) is the second cell identifier, and K is an integer greater than 3 and less than or equal to 14,
   wherein a length for the SSS based on the first sequence multiplied by the second sequence is 127,
   wherein a number of the first sequence is 9 and a number of the second sequence is 112,
   wherein a first polynomial expression for generating the first sequence is identical to a polynomial expression for generating the PSS, and
   wherein a second polynomial expression for generating the second sequence is different from a polynomial expression for generating the PSS.

12. The method of claim 11, wherein K=5.

13. The method of claim 11, wherein the SSS is generated by multiplying elements of the first sequence by respective elements of the second sequence.

14. The method of claim 11, wherein the SSS is mapped to resource elements not reserved for other purposes.

15. The method of claim 11, wherein the SSS is mapped to an antenna port identical to an antenna port to which the PSS is mapped.

16. A user equipment (UE) for receiving a primary synchronization signal (PSS) and a secondary synchronization signal (SSS) in a wireless communication system, the UE comprising:
   a transceiver; and
   a processor operatively connected to the transceiver and configured to:
      receive, from a base station (BS) the PSS; and
      receive, from the BS, the SSS based on a first sequence multiplied by a second sequence, the first sequence based on a first shift index and the second sequence based on a second shift index;
   wherein the first shift index is equal to K*(3 floor(NID(1)/112)+NID(2)), and
   wherein the second shift index is equal to NID(1) mod 112,
   where NID(1) is the first cell identifier, NID(2) is the second cell identifier, and K is an integer greater than 3 and less than or equal to 14,
   wherein a length for the SSS based on the first sequence multiplied by the second sequence is 127, wherein a number of the first sequence is 9 and a number of the second sequence is 112, wherein a first polynomial expression for generating the first sequence is identical to a polynomial expression for generating the PSS, and wherein a second polynomial expression for generating the second sequence is different from a polynomial expression for generating the PSS.

17. The UE of claim 16, wherein K=5.

18. The UE of claim 16, wherein the SSS is generated by multiplying elements of the first sequence by respective elements of the second sequence.

19. The UE of claim 16, wherein the SSS is mapped to resource elements not reserved for other purposes.

20. The UE of claim 16, wherein the SSS is mapped to an antenna port identical to an antenna port to which the PSS is mapped.

* * * * *